United States Patent [19]

Gotoh et al.

[11] 4,411,971
[45] Oct. 25, 1983

[54] LITHIUM COMPOUNDS

[75] Inventors: Akira Gotoh, Fuchu; Hidehito Obayashi, Tokyo; Ryo Nagai, Nara; Shouji Mochizuki, Suita; Tetsuichi Kudo, Tokyo, all of Japan

[73] Assignee: Hitachi Maxell, Ltd., Japan

[21] Appl. No.: 371,798

[22] Filed: Apr. 26, 1982

[30] Foreign Application Priority Data

Apr. 27, 1981 [JP] Japan .................................. 56/62381

[51] Int. Cl.³ .............................................. H01M 6/18
[52] U.S. Cl. ...................................... 429/191; 429/33; 429/199; 252/62.2; 423/179.5
[58] Field of Search ...................... 429/191, 199, 30–33; 204/195 S; 423/179.5, 351, 409, 462, 472, 499, 644; 252/62.2

[56] References Cited

U.S. PATENT DOCUMENTS 4,367,269 1/1983 Nagai et al. .......................... 429/191

Primary Examiner—Charles F. Lefevour
Attorney, Agent, or Firm—Antonelli, Terry & Wands

[57] ABSTRACT

This invention relates to lithium compounds composed of a lithium halide and lithium imide. The compounds are high in lithium ionic conductivity and are used as solid electrolytes. Particularly excellent ones of the lithium compounds are those represented by the general formula:

$$yLi_2NH \cdot (1-y)LiX$$

where X represents Cl, Br or I and y denotes the molar fraction of lithium imide ranging from about 0.35 to about 0.98 when X is chlorine, from about 0.25 to about 0.35 when X is bromine or from about 0.33 to about 0.75 when X is iodine.

15 Claims, 4 Drawing Figures

LITHIUM COMPOUNDS

BACKGROUND OF THE INVENTION

This invention relates to lithium compounds, and particularly to lithium compounds which have high lithium ionic conductivity and are useful as lithium ionic conductive solid electrolytes.

A variety of lithium compound have been expected as highly promising material for use as lithium ionic conductor on an industrial basis. Namely, when a solid lithium ionic conductor is used in various types of electrochemical devices, there will be obtained following several characteristic features that could not be attained in the past. For example, there will be no fear of leak or salting of electrolyte, the device can be used for a longer period of time and can have a much smaller and thinner configuration. Therefore, solid lithium ionic conductors are expected to have a number of applications such as very thin type cells and electrochromic displays.

When such a solid electrolyte is used for a cell or the like, it must meet several requirements. However, hitherto there have not been found any lithium compound that can meet all these requirements, and there is a keen demand for the availability of a lithium compound which has a sufficient lithium ionic conductivity at room temperature.

SUMMARY OF THE INVENTION

It is an object of this invention to provide a novel lithium compound which has sufficient lithium ionic conductivity.

Another object of this invention is to provide a solid electrolyte which has sufficient lithium ionic conductivity.

These and other objects of the invention are attained by a lithium compound composed of a lithium halide and lithium imide.

DETAILED DESCRIPTION OF PREFFERED EMBODIMENTS

Figure 1:
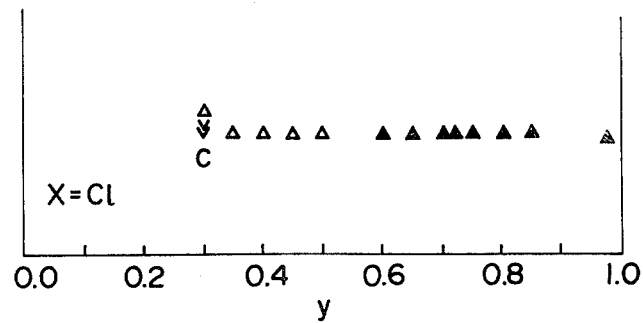
FIGS. 1, 2 and 3 are diagrams each showing the relationship between the species of the compound of this invention and y which denotes the molar fraction of lithium imide present in the compound.

The compound according to this invention is composed of a lithium halide (herein LiCl, LiBr and LiI are generally referred to as lithium halide) and lithium imide, and is produced by mixing specified amounts of the two component substances with each other and heating the resulting mixture.

Lithium imide, $Li_2NH$, can be prepared by the method reported by B. A. Boukamp et al. (Phys. Lett. 72A, 464 (1979)).

In this method, lithium nitride ($Li_3N$) is heated, for example, at 500° C. for about 30 min in a gaseous 50/50 mixture of nitrogen and hydrogen, to obtain $Li_2NH$ by the following reactions (1) and (2).

$$Li_3N + H_2 \rightarrow Li_2NH + LiH \qquad (1)$$

$$4LiH + N_2 \rightarrow 2Li_2NH + H_2 \qquad (2)$$

To bring the reaction (2) to complete, it is useful to conduct further heating in nitrogen at about 600° C. for about 3 hours.

A product obtained in this way was filled in glass capillaries and the product was identified by X-ray powder diffraction method (the Debye-Scherrer method) to confirm the formation of $Li_2NH$.

Each of predetermined amounts of the thus obtained $Li_2NH$ was intimately mixed with a predetermined amount of LiCl, LiBr or LiI to form different mixtures. Each of the mixtures was pressure-molded into a disk-shaped pellet by using a die of 15 mm in diameter and a molding force of 2 tons. All the operations such as mixing of raw materials and molding of each mixture were carried out in a nitrogen atmosphere. In addition, since LiBr contained water, it was previously dehydrated by a prethermal treatment carried out in nitrogen gas at 400° C. for 15 hours.

Then, the resulting pellets were heat-treated in a nitrogen atmosphere at 400°–500° C. for 30 hours to produce six kinds of compounds.

Each of the compounds thus obtained was analyzed by the X-ray powder diffraction method to determine the d-value (interplanar spacing) and the relative intensity $I/I_o$. The results are shown in Table 1, in which X represents the species of halogen in the lithium halide used as raw material, and y denotes the molar fraction of lithium imide in the general formula $yLi_2NH\cdot(1-y)LiX$ which represents the compound of this invention.

TABLE 1

| Compound ① X = Cl, y = 0.45 | | Compound ② X = Cl, y = 0.75 | | Compound ③ X = Br, y = 0.25 | | Compound ④ X = Br, y = 0.55 | | Compound ⑤ X = I, y = 0.33 | | Compound ⑥ X = I, y = 0.75 | |
|---|---|---|---|---|---|---|---|---|---|---|---|
| d-value[1] | $I/I_o$[2] | d-value[1] | $I/I_o$[2] | d-value[1] | $I/I_o$[2] | d-value[1] | $I/I_o$[2] | d-value[1] | $I/I_o$[2] | d-value[1] | $I/I_o$[2] |
| 3.04 | 100 | 2.98 | 100 | 5.12 | 8 | 4.91 | 10 | 5.42 | 8 | 6.00 | 47 |
| 2.97 | 30 | 2.58 | 18 | 4.43 | 5 | 3.13 | 100 | 4.72 | 7 | 3.67 | 96 |
| 2.66 | 6 | 1.82 | 35 | 3.13 | 100 | 2.71 | 42 | 3.33 | 100 | 3.13 | 100 |
| 2.63 | 20 | 1.556 | 14 | 2.67 | 9 | 1.91 | 17 | 2.84 | 8 | 2.59 | 17 |
| 2.57 | 33 | 1.489 | 2 | 2.56 | 3 | 1.81 | 7 | 2.72 | 6 | 2.38 | 25 |
| 1.86 | 23 | 1.290 | 2 | 2.21 | 12 | 1.629 | 16 | 2.36 | 14 | 2.11 | 28 |
| 1.82 | 12 | 1.184 | 3 | 2.03 | 5 | 1.561 | 4 | 2.16 | 6 | 1.99 | 23 |
| 1.63 | 2 | | | 1.98 | 3 | 1.410 | 2 | 2.11 | 5 | 1.83 | 16 |
| 1.586 | 11 | | | 1.806 | 25 | 1.354 | 3 | 1.93 | 26 | 1.751 | 11 |
| 1.551 | 7 | | | 1.703 | 2 | 1.238 | 3 | 1.817 | 5 | 1.637 | 15 |
| 1.521 | 3 | | | 1.564 | 6 | 1.208 | 3 | 1.669 | 8 | 1.579 | 6 |
| 1.487 | 4 | | | 1.495 | 2 | | | 1.596 | 3 | 1.450 | 6 |
| 1.314 | 2 | | | 1.399 | 7 | | | 1.574 | 3 | 1.383 | 10 |
| 1.286 | 3 | | | 1.277 | 2 | | | 1.493 | 10 | 1.347 | 9 |
| 1.207 | 4 | | | 1.182 | 5 | | | 1.363 | 4 | 1.220 | 5 |
| 1.178 | 5 | | | 1.151 | 2 | | | 1.323 | 3 | 1.193 | 3 |
| 1.149 | 3 | | | 1.042 | 2 | | | 1.262 | 9 | 1.136 | 5 |

TABLE 1-continued

| Compound ① X = Cl, y = 0.45 | | Compound ② X = Cl, y = 0.75 | | Compound ③ X = Br, y = 0.25 | | Compound ④ X = Br, y = 0.55 | | Compound ⑤ X = I, y = 0.33 | | Compound ⑥ X = I, y = 0.75 | |
|---|---|---|---|---|---|---|---|---|---|---|---|
| d-value[1] | I/Io[2] | d-value[1] | I/Io[2] | d-value[1] | I/Io[2] | d-value[1] | I/Io[2] | d-value[1] | I/Io[2] | d-value[1] | I/Io[2] |
| | | | | | | 0.989 | 1 | 1.231 | 2 | | |
| | | | | | | | | 1.183 | 2 | | |
| | | | | | | | | 1.113 | 3 | | |
| | | | | | | | | 1.058 | 2 | | |

Note [1]: d-values are in Angstrom unit.
Note [2]: Relative intensity

The d-values and relative intensities for $Li_2NH$, LiCl, LiBr and LiI used as raw materials are reported respectively on ASTM Cards 6-0417, 4-0664, 6-0319 and 1-0592. However, the results shown in Table 1 are entirely different from the values listed on the ASTM Cards. This difference confirms that novel compounds were formed by the process described above.

When the d-values for the compounds ②, ③, ⑤ and ⑥ in Table 1 were calculated assuming the compounds to be of cubic lattice types having the lattice constant a of 5.16, 8.86, 9.45 and 10.36 Å respectively, the resulting d-values agreed very closely with the measured values shown in Table 1 and, moreover, the Miller indices obtained by indexing showed a common regularity in all cases of the compounds.

Namely, each of the diffraction lines for the compounds ②, ③, ⑤ and ⑥ shown in Table 1 had the Miller indices h, k, l that were either all even or all odd (in no case, an even number and an odd number were coexistent in a single set of the Miller indices).

Accordingly, it was recognized that the lattice types of the compounds ②, ③, ⑤ and ⑥ were all face-centered cubic (fcc) and the values of the lattice constant a were 5.16 Å, 8.86 Å, 9.45 Å and 10.36 Å respectively.

On the other hand, the compounds ① and ④ in Table 1 had so complicated crystal structures that their lattice types could not be identified.

Figure 2:
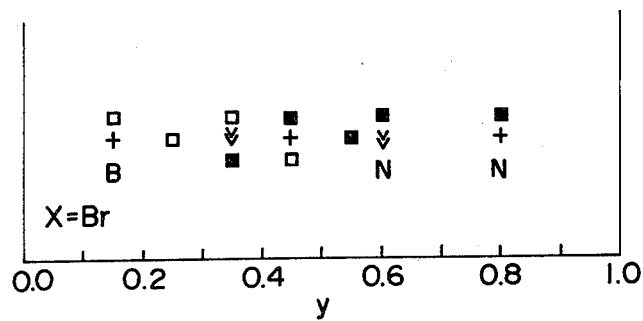
Figure 3:
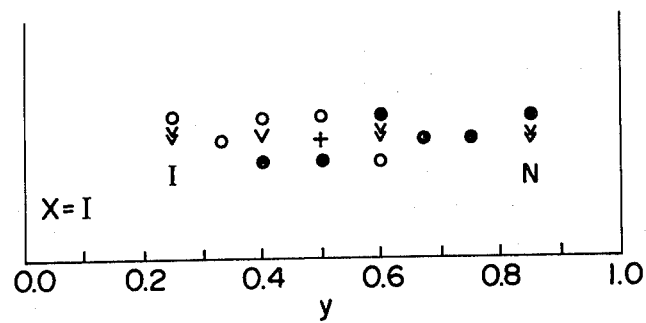

In the next place, the above procedure was repeated while changing the valves of X and y in the general formula set forth above, to obtain the compositional ranges in which the compounds can exist as stable ones. The results are shown in FIGS. 1, 2 and 3. In these Figures, the symbols C, B, I and N represent LiCl, LiBr, LiI and $Li_2NH$, respectively.

FIG. 1 shows the results for the case of X=Cl, in which the symbols △ and ▲ indicate that the compound $yLi_2NH.(1-y)LiCl$ was able to exist stably as single phase of unidentified structure and as a single phase face-centered cubic (fcc), respectively. The symbol ∇ indicates that one crystal type phase predominated over the other.

As is clear from FIG. 1, when X is Cl, the compound can exist as stable one, if y is in the range of about 0.35 to about 0.98.

When y became 0.30, a considerable amount of LiCl was found to be coexistent and, on the other hand, when y exceeded 0.98, $Li_2NH$ was found to be coexistent. Therefore, the range of y in which the compound can exist as a single one is about 0.30 to about 0.98, when X is Cl.

FIG. 2 shows the results for the case of X=Br, in which the symbols □ and ■ indicate that the compound $yLi_2NH.(1-y)LiBr$ could exist stably with the crystal structure of face-centered cubic (fcc) lattice and of unidentified type, respectively. The symbol + indicates As is clear from FIG. 2, when X is Br, the range of y in which the compound can exist stably with face centered cubic (fcc) lattice or with an unidentified crystal structure was from about 0.25 to about 0.55. When y was decreased to 0.15, an LiBr phase came to appear and, on the other hand, when y was 0.6 or larger, a phase of $Li_2NH$ became coexistent with the matrix.

FIG. 3 shows the results for the case of X=I, in which the symbols ◉ and ○ indicate that the compound $yLi_2NH.(1-y)LiI$ could exist stably with face centered cubic (fcc) structure having a lattice constant of 9.45 Å and of 10.36 Å, respectively. The symbol ∇ indicates that one lattice type predominated over the other.

It was recognized that the compound $yLi_2NH.(1-y)LiI$ could exist stably as one having face centered cubic (fcc) structure when y was in the range of about 0.33 to about 0.75. When y was 0.25 and when it was 0.85, a small but appreciable amount of LiI and $Li_2NH$, respectively, was found to be coexistent with the matrix.

As described above, the lithium compound of this invention is produced by mixing specified amounts of a lithium halide and lithium imide with each other and heating the resulting mixture.

This reaction proceeds at a temperature of at least about 300° C., and the reaction rate becomes very high at temperatures of 350° C. or higher.

However, at a temperature of about 750°-800° C., although the lithium halide remains stable, $Li_2NH$ will decompose. Therefore, it should be avoided to heat the mixture to a temperature of 700°-800° C. or higher.

In addition, the reaction is carried out in an inert gas such as nitrogen, argon and helium or in a hydrogen atmosphere. When the reaction is conducted in a vacuum or at a reduced pressure, raw materials or reaction products will be more likely to decompose. Therefore, it is preferable to carry out the reaction at an atmospheric pressure or at a pressure approximate to it.

The compound of the above-mentioned general formula in which X is Cl has a melting point slighlty differing in accordance with the value of y but substantially within the range of about 490° to 600° C. Similarly, the melting points of the compounds corresponding to X=Br and X=I, respectively, are 450°-460° C. and 410°-550° C.

When the compounds are heated to these respective temperatures, they are melted, and yet they remain stable without decomposing. However, when the temperature is raised to about 750°-800° C. or higher, the compounds will decompose, which is considered to arise from the decomposition and the resulting escape or evaporation of NH present in the ionic crystals constituting the compounds.

EXAMPLE 1

Each of the above mentioned compounds ① to ⑥ was molded into a disk-shaped pellet of 2 to 3 mm in thickness by using a die of 10 mm in diameter and a molding face of 2 tons. An electrode was formed by uniformly dispersing Pb-added PbI₂ on one side of the disk-shaped compound, and the whole was pressure-molded at a molding pressure of 2 tons to obtain a disk-shaped double-layer pellet consisting of a layer of the compound and a layer of Pb-added PbI₂.

Furthermore, a piece of metallic lithium was pressure-bonded to the other side of the pellet to form anode, whereby a cell having a structure of PbI₂(Pb)|the above compound|Li was obtained.

When the e.m.f. of each of the thus obtained cells was measured at room temperature, an e.m.f. of 1.90 V was obtained, which was coincident with the theoretical value. Thus, it was confirmed that the compounds ① to ⑥ are lithium ionic conductors useful as solid electrolyte.

EXAMPLE 2

Each of the compounds ① to ⑥ was molded into a disk-shaped pellet of 2 to 3 mm in thickness by using a die of 10 mm in diameter and a molding force of 1 ton.

The disk-shaped pellets thus obtained were then provided with silver electrodes respectively on both sides thereof. The resulting assemblies were served to AC-impedance measurements in an electric furnace provided with temperature control means, to determine the temperature dependence of lithium ionic conductivity of each of the compounds ① to ⑥.

Figure 4:
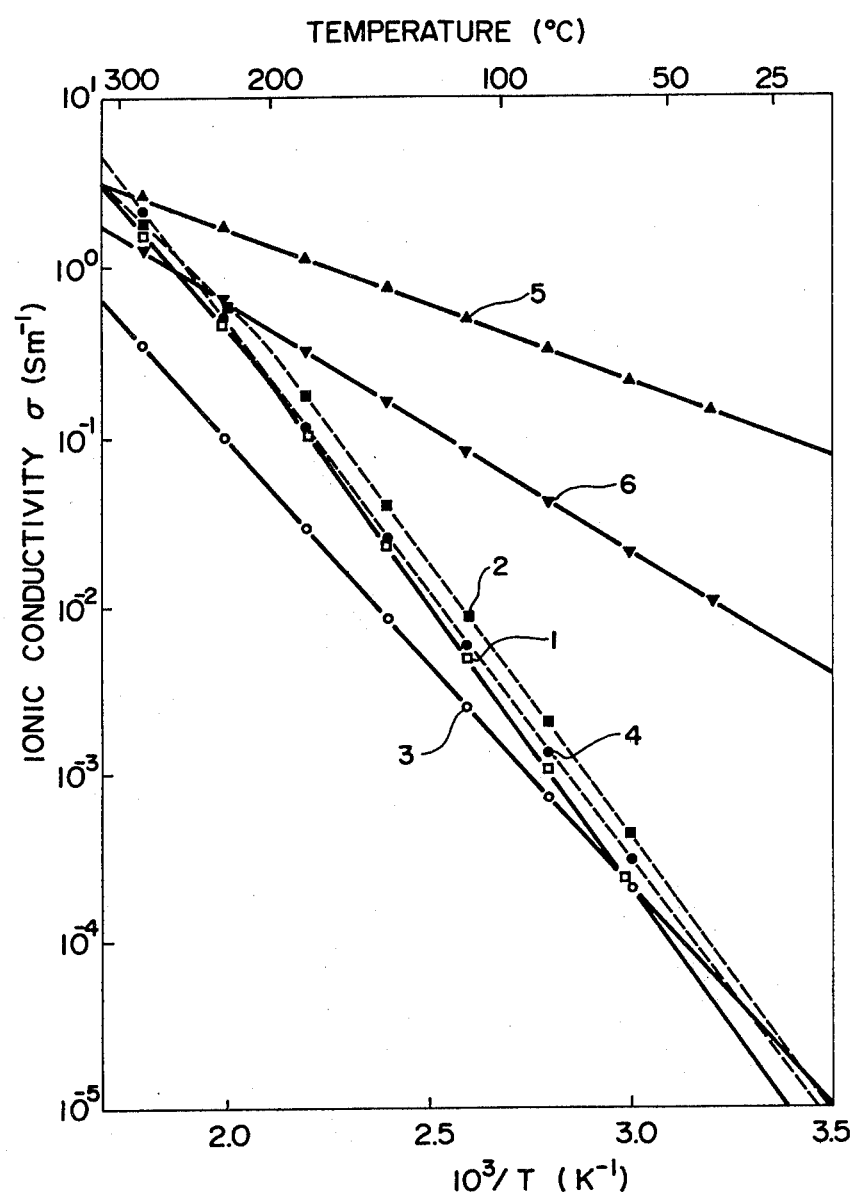
FIG. 4 is a diagram showing the Arrhenius plots for the ionic conductivity of the compounds of this invention.

The measurements were carried out in the conditions of a frequency 1 KHz, a loaded voltage of 100 mV rms and an atmosphere of nitrogen. FIG. 4 shows the temperature dependence of ionic conductivity of the compounds ① to ⑥ which had been sintered at 300° to 500° C. for 10 min.

In FIG. 4, the lines 1 to 6 indicate the Arrhenius plots for the ionic conductivity of the compounds ① to ⑥, respectively.

As is clear from FIG. 4, among the compounds according to this invention, the compounds ⑤ and ⑥ have high ionic conductivities of $1.0 \times 10^{-1}$ Sm$^{-1}$ and $6.0 \times 10^{-3}$ Sm$^{-1}$, respectively, and they are superior in temperature dependence of ionic conductivity.

Accordingly, among the compounds of this invention, those containing iodine as halogen X in the general formula are particularly suitable for various applications such as room-temperature types of solid state battery, electrochromic display, voltamometer, capacitor, alkaline ion selective film and coulometer.

What is claimed is:

1. A lithium compound composed of a lithium halide and lithium imide.

2. A lithium compound according to claim 1, having a composition represented by the general formula $$yLi_2NH.(1-y)LiX$$

where X is chlorine, bromine or iodine, and y is the molar fraction of lithium imide in the range of about 0.35 to about 0.98 when X is chlorine, about 0.25 to about 0.55 when X is bromine, or about 0.33 to about 0.75 when X is iodine.

3. A lithium compound according to claim 2, wherein X in said general formula is Cl.

4. A lithium compound according to claim 2, wherein X in said general formula is Br.

5. A lithium compound according to claim 2, wherein X in said general formula is I.

6. A lithium ionic conductive solid electrolyte consisting of a lithium compound which is composed of a lithium halide and lithium imide.

7. A lithium ionic conductive solid electrolyte according to claim 6, consisting of a lithium compound which has a composition represented by the general formula:

$$yLi_2NH.(1-y)LiX$$

where X is chlorine, bromine or iodine, and y denotes the molar fraction of lithium imide in the range of about 0.35 to about 0.98 when X is chlorine, about 0.25 to about 0.55 when X is bromine, or about 0.33 to about 0.75 when X is iodine.

8. A lithium ionic conductive solid electrolyte according to claim 7, wherein X in said general formula is Cl.

9. A lithium ionic conductive solid electrolyte according to claim 7, wherein X in said general formula is Br.

10. A lithium ionic conductive solid electrolyte according to claim 7, wherein X in said general formula is I.

11. A cell comprising a lithium ionic conductive solid electrolyte with electrodes provided repsectively on both sides thereof, said solid electrolyte consisting of a lithium compound which is composed of a lithium halide and lithium imide.

12. A cell according to claim 11, wherein said lithium compound has a composition represented by the general formula:

$$yLi_2NH.(1-y)LiX$$

wherein X is chlorine, bromie or iodine and y denotes a number in the range of about 0.33 to about 0.98 when X is chlorine, about 0.25 to about 0.55 when X is bromine, or about 0.33 to 0.75 when X is iodine.

13. A cell according to claim 12, wherein X in said general formula is Cl.

14. A cell according to claim 12, wherein X in said general formula is Br.

15. A cell according to claim 12, wherein X in said general formula is I.

* * * * *